C. Q. HAYES.
Shaft-Coupling.

No. 225,126.  Patented Mar. 2, 1880.

Witnesses:
Clarence Poole

Inventor:
Calvin Q. Hayes
by Ellis Spear
Atty

UNITED STATES PATENT OFFICE.

CALVIN Q. HAYES, OF SPRING GREEN, WISCONSIN.

SHAFT-COUPLING.

SPECIFICATION forming part of Letters Patent No. 225,126, dated March 2, 1880.

Application filed September 30, 1879.

*To all whom it may concern:*

Be it known that I, CALVIN Q. HAYES, of Spring Green, in the county of Sauk and State of Wisconsin, have invented a new and useful Improvement in Shaft-Couplings; and I do hereby declare that the following is a full, clear, and exact description of the same.

My invention consists in an improved construction of shaft-coupling, wherein the friction of the bearing-surfaces shall be, as far as possible, reduced, while perfect freedom and play is given to the shaft; and the invention consists in combining, with the socket and the end of the shaft, an anti-friction roller passing through the end of the shaft itself, which is hollowed or recessed for the reception of it, the ends of the roller bearing on seats in the sides of the socket, the invention being described hereinafter in detail, and fully pointed out in the claims.

Figure 1:
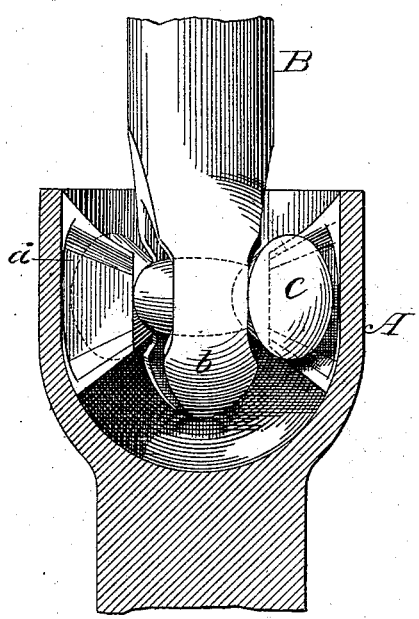
Figure 2:
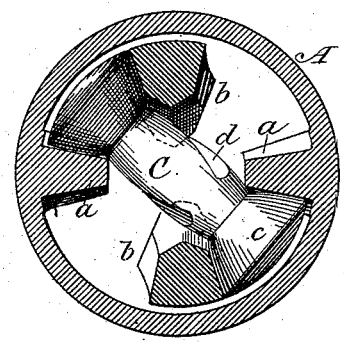
Figure 3:
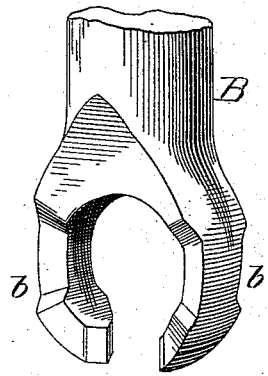
Figure 4:
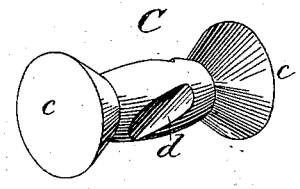

In the drawings hereunto attached, and forming a part of the specification, Figure 1 is a horizontal section; Fig. 2, a vertical section through the seats or projections; Figs. 3 and 4, separate views, respectively, of the end of the shaft and of the roller.

A represents the metallic socket, and B the shaft adapted to be inserted therein. The socket is formed with two projections, $a\ a$, each having two bearing-surfaces placed opposite one another. The sides forming the bearing-surfaces are made concave, as shown in Fig. 1, and the projections form, preferably, an integral part of the socket, but may be secured to it, if desired.

B represents the shaft, the end of which is widened in one direction and tapered in the other, as shown, and hollowed out, thus forming two curved arms, $b\ b$, surrounding an approximately-annular space, and nearly meet at their ends. The thickness of the arms is such that the end of the shaft may be inserted diagonally between the bearing-projections in the socket, allowing perfect freedom of motion to the shaft.

In the curved opening formed by the arms $b\ b$ is placed a spool-shaped anti-friction roller, C, (shown separately in Fig. 3 of the drawings.) It has at each end a head, $c$, conical in form, and the body between the heads has a regular and uniform swell toward the middle from both ends. As the body of the roller is larger in diameter than the space between the ends of the arms $b\ b$, for convenience I provide diagonal grooves $d\ d$ in the sides, (shown in Fig. 4,) so that the roller can be slipped into the opening in the shaft. Thus there is no danger of the removal of the roller, as it can only be withdrawn by bringing both grooves in line with the arms $b\ b$.

The shaft is inserted in the socket, causing the roller to assume a diagonal position between the projections $a\ a$, each of the heads $c$ bearing on one of the concave sides of such projections, as shown. Thus when the parts are in the position shown in Fig. 1 the shaft would have a circular motion from left to right, which motion would be reversed by placing the roller in the opposite direction and bringing the heads to bear on the other sides of the projecting bearing-surfaces. With either motion the circular heads have a vertical movement against the sides of the projections $a$, reducing the friction, while allowing perfect freedom of motion to the shaft with certain limits, which may operate at any angle.

The operating manner of the device does not differ from that commonly employed and will be evident to those skilled in the art.

Having thus described my invention, what I claim as new, and desire to secure by Letters Patent, is—

1. The combination, with the socket and the projections $a\ a$, situated opposite one another and having concave bearing-surfaces, of the spool-shaped anti-friction roller C and the bifurcated shaft B, all substantially as and for the purposes set forth.

2. The combination, with the bifurcated shaft having the curved arms $b\ b$, of the spool-shaped anti-friction roller provided with grooves, substantially as and for the purposes set forth.

3. The combination, with the socket and the projections $a\ a$, having concave bearing-surface, of the anti-friction roller C, having conical heads $c\ c$, placed diagonally between said projections, each of its heads bearing on one of the said concave bearing-surfaces, substantially as described and shown.

4. A shaft-coupling consisting of a socket having projections, a shaft, and a roller, in which the motion of the shaft is reversed by changing the bearing-surfaces of the roller and projections, as described.

5. A shaft-coupling consisting of a socket having projections placed opposite one another with concave bearing-surfaces, a shaft having a bifurcated end, and a roller with conical bearing-surfaces at each end and provided with diagonal grooves, all constructed and arranged as described and shown.

6. In a shaft-coupling, the spool-shaped anti-friction roller constructed of a single piece of metal, and provided with the grooves $d$, substantially as and for the purpose set forth.

In testimony whereof I have signed my name to this specification in the presence of two subscribing witnesses.

CALVIN Q. HAYES.

Witnesses:
J. F. MORROW,
D. L. TALBOT.